US007565404B2

(12) United States Patent
Gwozdz

(10) Patent No.: US 7,565,404 B2
(45) Date of Patent: Jul. 21, 2009

(54) EMAIL EMOTIFLAGS

(75) Inventor: Daniel Gwozdz, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 835 days.

(21) Appl. No.: 11/152,524

(22) Filed: Jun. 14, 2005

(65) Prior Publication Data

US 2006/0282503 A1 Dec. 14, 2006

(51) Int. Cl.
*G06F 15/16* (2006.01)

(52) U.S. Cl. ....................................... 709/206; 455/566

(58) Field of Classification Search ................. 709/206; 455/566

See application file for complete search history.

(56) References Cited

U.S. PATENT DOCUMENTS 5,995,093 A * 11/1999 Lambourne et al. ......... 715/716
6,069,622 A * 5/2000 Kurlander ................... 715/753
2002/0194002 A1* 12/2002 Petrushin .................... 704/270
2003/0145058 A1* 7/2003 Chan et al. .................. 709/206
2004/0018858 A1* 1/2004 Nelson ....................... 455/566
2004/0024822 A1* 2/2004 Werndorfer et al. ......... 709/206
2005/0033814 A1* 2/2005 Ota ........................... 709/206
2005/0107127 A1* 5/2005 Moriya ....................... 455/566
2005/0156873 A1* 7/2005 Walter et al. ................ 345/156
2006/0015812 A1* 1/2006 Cunningham et al. ....... 715/535
2006/0053386 A1* 3/2006 Kuhl et al. .................. 715/773
2006/0068766 A1* 3/2006 Xu et al. .................. 455/414.1
2007/0288898 A1* 12/2007 Isberg ........................ 717/124

FOREIGN PATENT DOCUMENTS

EP 1595586 A2 * 11/2005

OTHER PUBLICATIONS

Rivera, K., Cooke, N. J., and Bauhs, J. A. 1996. The effects of emotional icons on remote communication. In Conference Companion on Human Factors in Computing Systems: Common Ground (Vancouver, British Columbia, Canada, Apr. 13-18, 1996). M. J. Tauber, Ed. CHI '96. ACM, New York, NY, 99-100.*

Kato, Y.; Sugimura, K.; Akahori, K., "Effect of contents of e-mail messages on affections," Computers in Education, 2002. Proceedings. International Conference on , vol., No., pp. 428-432 vol. 1, Dec. 3-6, 2002.*

"Opera Mail", Opera Software, printed from website: http://www.opera.com/products/desktop/m2/, printed on Jun. 9, 2005, 2 pages.

* cited by examiner

*Primary Examiner*—Larry D Donaghue
*Assistant Examiner*—Ajay Bhatia
(74) *Attorney, Agent, or Firm*—Lee & Hayes, PLLC

(57) ABSTRACT

Email emotiflags are described. A collection of emotiflags, each including a graphical icon and a text tag is maintained. Custom emotiflags may be defined by a user. While composing an email message, a user may associate an emotiflag with the email message such that when the email message is sent, the emotiflag is sent with the email message. Email messages may be received that include emotiflags. New emotiflags may be saved from a received email message for later association with other email messages. Email messages may be filtered, sorted, or otherwise processed based on associated emotiflags.

20 Claims, 11 Drawing Sheets

204
MSN
Send Message Cancel Save Draft Share Photos Attach File Check Names More
From: Bob (bobsmith@examplex.com)
To: Mom (lindasmith@exampley.com)
CC:
Subject: A Nice Story
Attachments: Story.txt
Emotiflag: Sweet
Customize Emotiflags
206
210
200
Funny!
Sweet
Time Critical
Good Idea!
Makes Me Mad!
Awesome!
Forget About It!
Sad
Worth Keeping
Cool!
208
202
Hi Mom!
Thought thi... brighten your day...

EMAIL EMOTIFLAGS

BACKGROUND

Many existing email applications enable users to apply color-coded flags to received email messages. These flags are frequently used to represent a status of the email messages (e.g., red for follow up; orange for reply; yellow for to do; and so on). Some email applications also enable users to mark a message as important (e.g., with a "!") or unimportant (e.g., with a "↓") before the message is sent, so that when a user receives the message, the importance of the message is clearly indicated.

Emoticons are graphical icons such as "☺", or textual representations of graphical icons such as ":-)". Emoticons have become very popular through instant messaging applications, and their use has recently expanded to inclusion in email messages. For example, a user may add a smiley face emoticon after a funny sentence in an email message. Emoticons are typically designed to represent an emotion or feeling.

Emoticons can be included within an email message; follow-up flags are useful for marking different types of received email messages; and importance flags can be useful for enabling an email sender to indicate to an intended email recipient, the importance of a message. However, there is no means by which to indicate an emotion associated with an email message.

SUMMARY

Email emotiflags are described. An emotiflag is made up of a graphical icon and a text tag, and may also include a textual representation of the graphical icon. A collection of emotiflags is maintained by an email application and made available to users. Users can modify existing emotiflags and create custom emotiflags. Users can also add an emotiflag to an email message they are composing so that when the email message is sent, the emotiflag is sent with the email message. Custom emotiflags received with email messages may be saved to the collection of emotiflags for later use.

DETAILED DESCRIPTION

The embodiments of email emotiflags described below provide techniques for customizing emotiflags, associating emotiflags with email messages to be sent, receiving custom emotiflags via email messages, and using emotiflags to manage email messages. An emotiflag is made up of a graphical icon, a textual representation of the icon, and a text tag to be associated with the icon. When the emotiflag is displayed, the icon and the textual phrase are displayed together. Alternatively, for example, if the system via which the emotiflag is being displayed does not support display of images, the textual representation of the icon and the text tag are displayed.

An electronic mail application maintains a collection of emotiflags that can be associated with email messages. A user can modify existing emotiflags or create new emotiflags. When composing an email message, a user can select an emotiflag to be included with the message. The emotiflag is transmitted along with the email message (e.g., as part of the header data).

Emotiflags may also be associated with received email messages as a way to categorize messages. Email messages, for example, in a user's inbox, can then be filtered, sorted, or otherwise processed based on emotiflags associated with the email messages.

Emotiflags may also be received with email messages. If a received email message has an associated emotiflag, the emotiflag may be displayed along with the email message. Furthermore, if the received emotiflag is not part of the collection of emotiflags maintained by the electronic mail application, then the user may choose to save the emotiflag to the collection.

The following discussion is directed to email emotiflags. While features of email emotiflags can be implemented in any number of different computing environments, they are described in the context of the following exemplary implementations.

Figure 1:
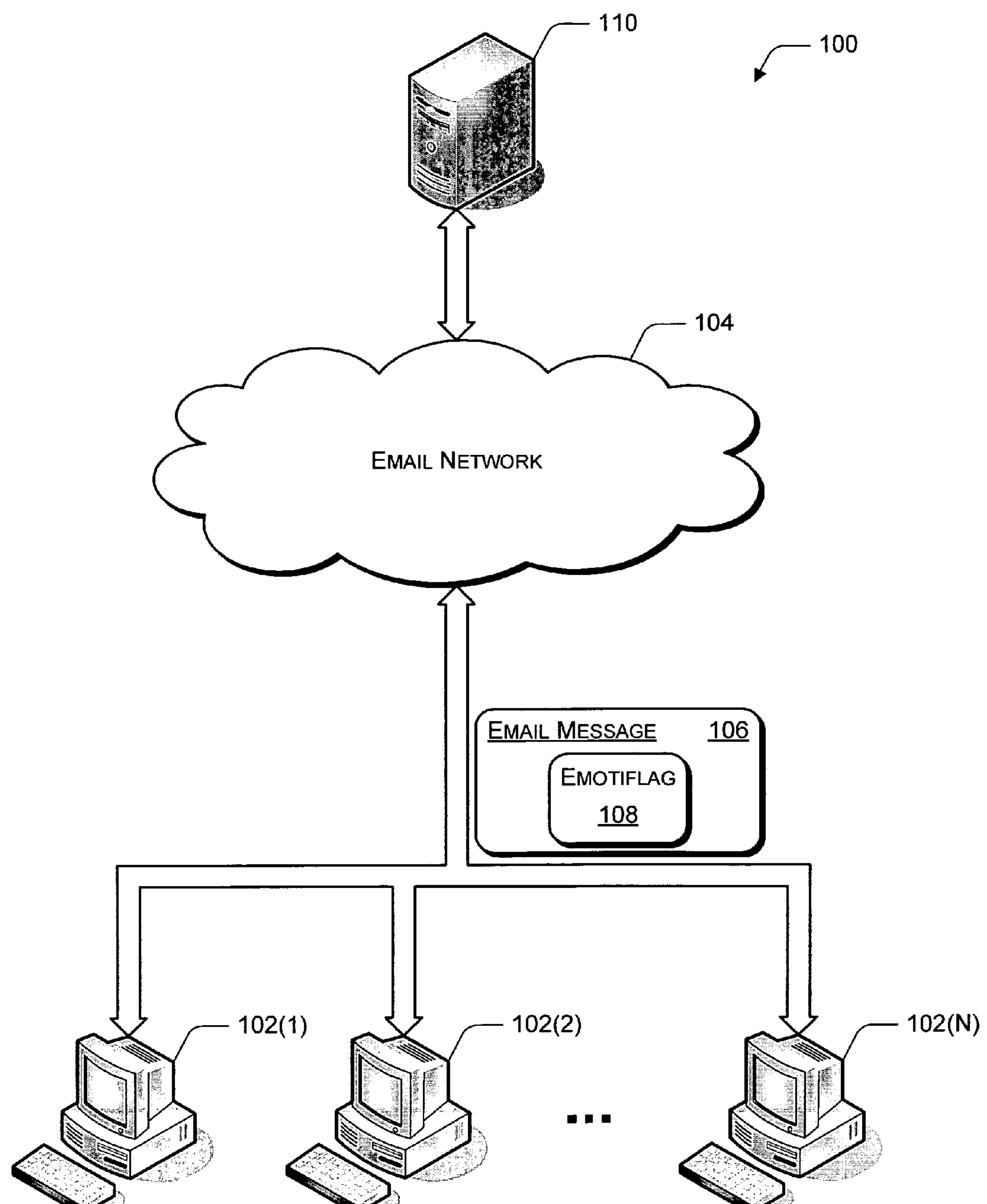
FIG. 1 is a pictorial diagram that illustrates an exemplary network environment in which email emotiflags may be implemented.

FIG. 1 illustrates an exemplary network environment 100 in which email emotiflags may be implemented. Client computer systems 102(1-N) are configured to exchange email messages with each other via an email network 104. For example, email message 106, which has an associated emotiflag 108 to denote an emotion associated with the email message, may be transmitted from one client computer system 102 to another client computer system 102 via email network 104. Client computer systems 102(1-N) are representative of any type of client device via which email messages may be composed and/or received, including, but not limited to, desktop computer systems, laptop computer systems, handheld computer systems, Internet-enabled cell phones, and so on. Email network 104 is representative of any type of network configuration over which email messages may be transmitted, including, but not limited to, a local area network (LAN), a wide area network (WAN), the Internet, a wired network, or a wireless network. Network environment 100 may also include email server 110, which may be configured to serve as a central email repository that can be accessed over email network 104 by any number of client systems 102.

Figure 2:
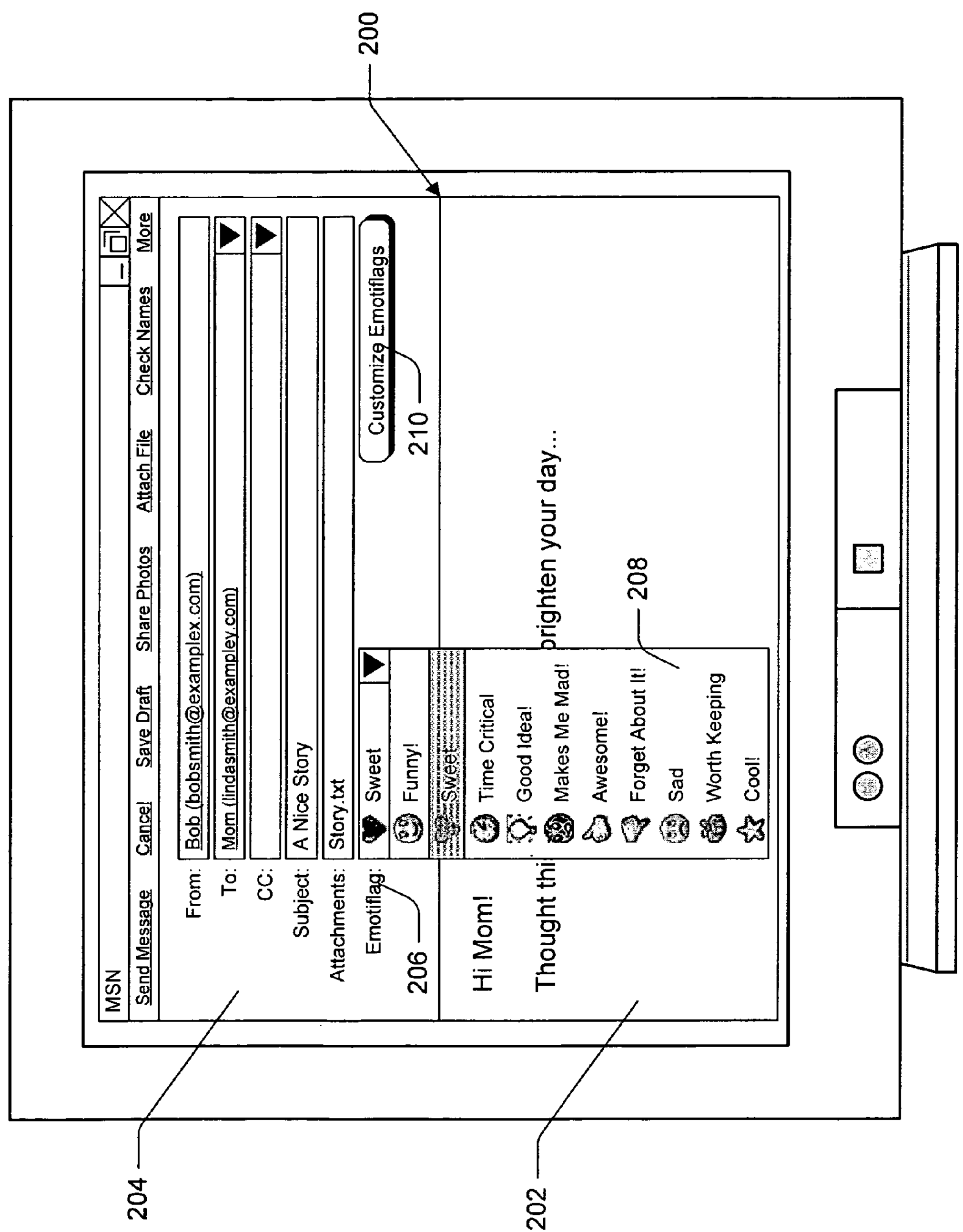
FIG. 2 is a pictorial diagram that illustrates an exemplary user interface for composing an email message with an associated emotiflag.

FIG. 2 illustrates an exemplary user interface 200 for composing an email message with an associated emotiflag. In the illustrated example, user interface 200 includes a message area 202 and a header area 204. In addition to the typical header data (e.g., from, to, cc:, subject, attachments, etc.), header area 204 also includes an emotiflag field 206. In the illustrated implementation, a drop-down list 208 provides a user with a list of available emotiflags from which to select an emotiflag to be associated with the message. Header area 204 also includes customize emotiflags button 210, which, when selected, causes another user interface screen to be displayed through which emotiflags may be created and/or modified. An example of such a user interface screen is described in further detail below with reference to FIG. 5.

When a user composes an email message, a standard set of header fields is typically added to the contents of the email message. For example, a user (e.g., Bob Smith) with email address BobSmith@exampleX.com may compose a message to another user (e.g., Linda Smith) with email address LindaSmith@exampleY.com. The header of such a message typically looks something like:

From: bobsmith@examplex.com (Bob Smith)
To: lindasmith@exampley.com (Linda Smith)
Date: Fri, Dec. 10, 2004 12:23:45 PST
Subject: A Nice Story
Attachments: story.txt If the message composer selects an emotiflag to be associated with the email message, as shown in FIG. 2, then additional data may be added to the header to support transmission of the emotiflag. For example, the header data may be modified to read:

From: bobsmith@examplex.com (Bob Smith)
To: lindasmith@exampley.com (Linda Smith)
Date: Fri, Dec. 10, 2004 12:23:45 PST
Subject: A Nice Story
Attachments: story.txt; sweet.bmp
X-Emotiflag: sweet.bmp, (L), Sweet As shown above, an X-Emotiflag field is added to the header data. The X-Emotiflag field includes the data needed to define the emotiflag (i.e., a filename associated with the icon, a textual representation of the icon, and a text tag). Furthermore, the file containing the icon graphic (e.g., sweet.bmp) is added to the message as an attachment. This ensures that the recipient will be able to display the emotiflag associated with the email message even if the emotiflag is not already supported by the recipient. For example, a user can create a custom emotiflag, and send it to another user in association with an email message. Because all of the needed data is contained in the message header, the recipient's email application can render the emotiflag with the email message.

Figure 3:
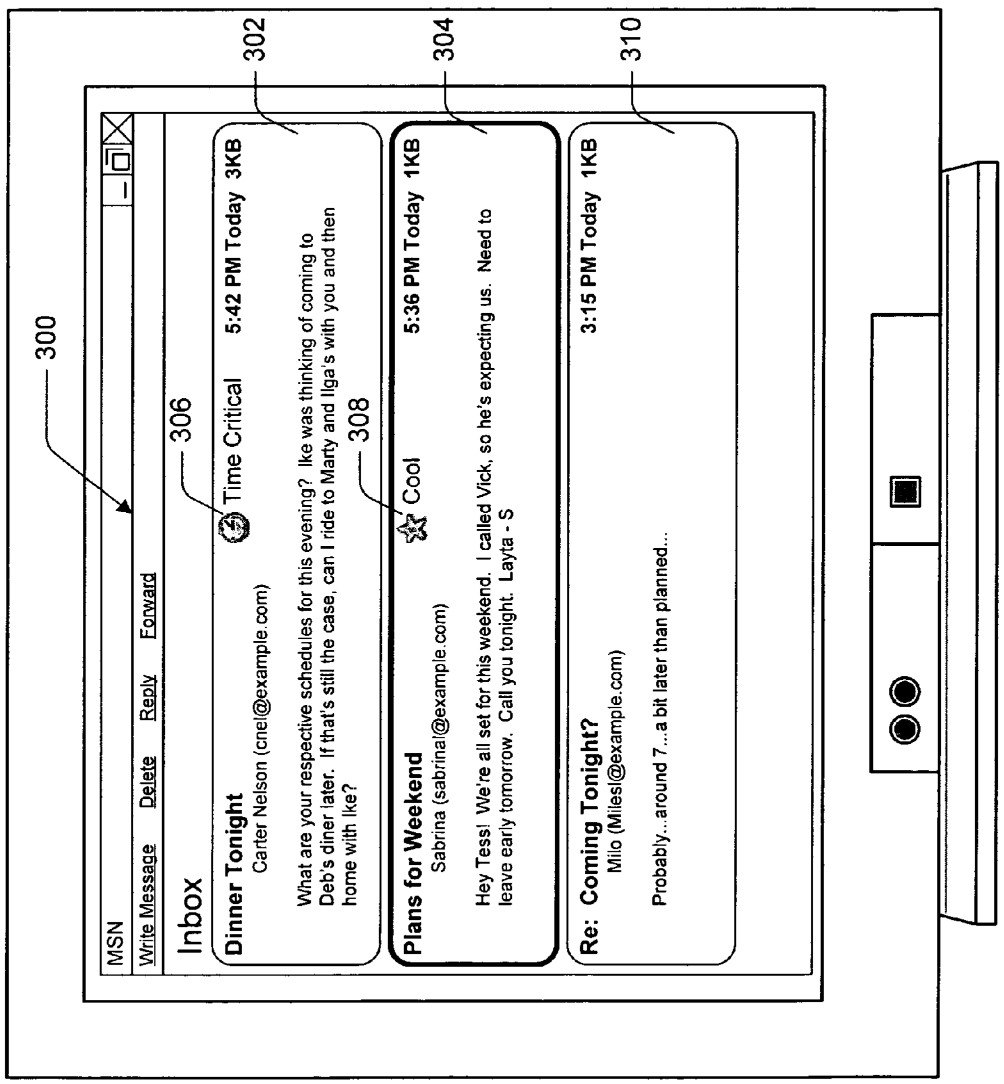
FIG. 3 is a pictorial diagram that illustrates an exemplary user interface for displaying received email messages that may have an associated emotiflag.

FIG. 3 illustrates an exemplary user interface 300 for viewing received email messages, each of which may have an associated emotiflag. For example, received email messages 302 and 304 have associated emotiflags 306 and 308, respectively. Email message 310 does not have an associated emotiflag. In an exemplary implementation, email messages may be sorted, filtered, or otherwise arranged, based on emotiflags.

Figure 4:
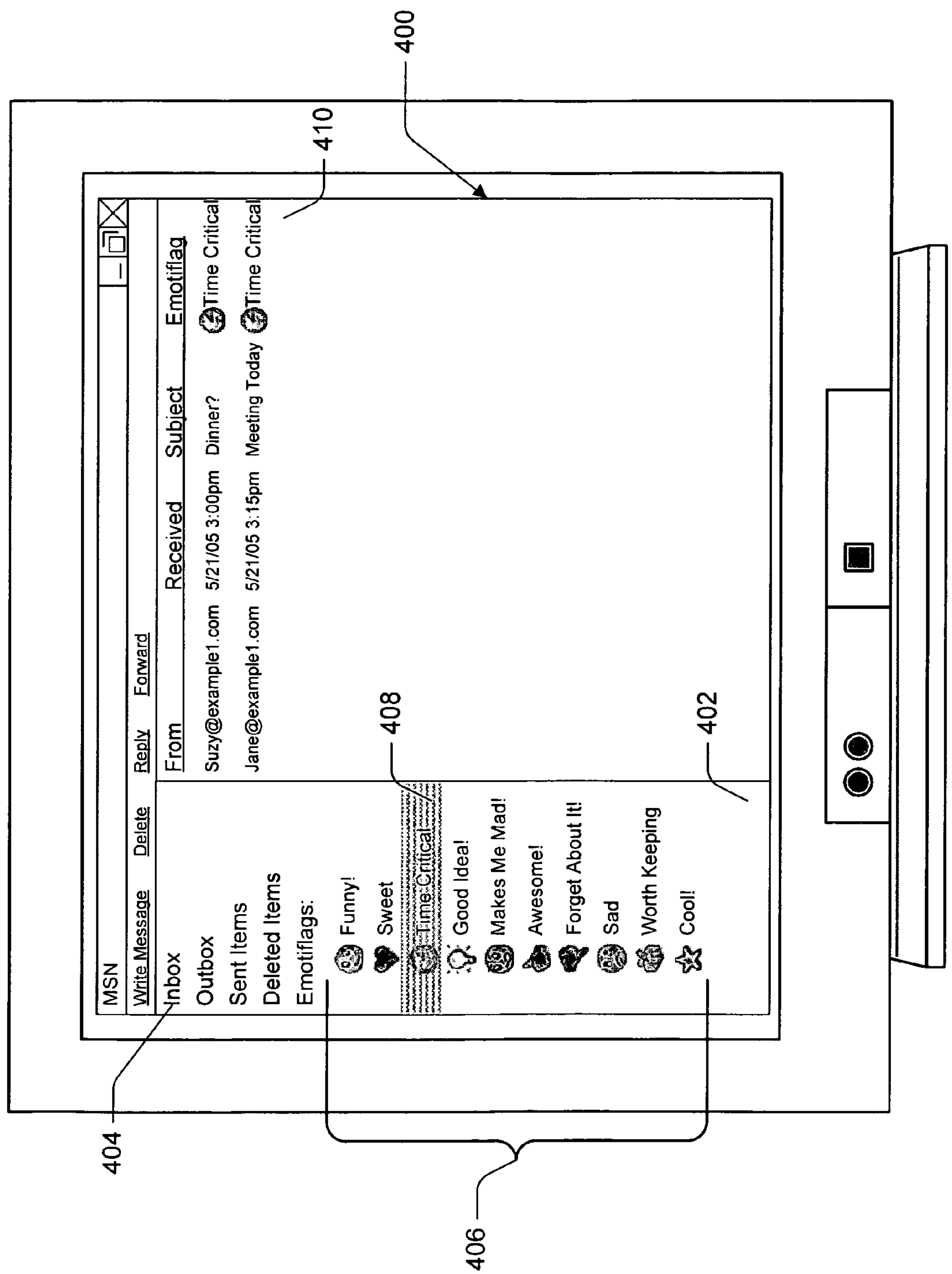
FIG. 4 is a pictorial diagram that illustrates an exemplary user interface for filtering email messages based on emotiflags.

FIG. 4 illustrates an exemplary user interface 400 for filtering email messages based on emotiflags. User interface 400 includes a selection area 402 that includes a list of filters that can be applied to email messages that are currently maintained for the user. For example, a user can choose to display only those email messages in his inbox by selecting "Inbox" 404 in the selection area 402. In the exemplary implementation, a list of available emotiflags 406 is also displayed in selection area 402. When a user selects a particular emotiflag, such as the time critical emotiflag 408, only those email messages with which the selected emotiflag is associated are displayed in the results area 410 of the user interface.

Figure 5:
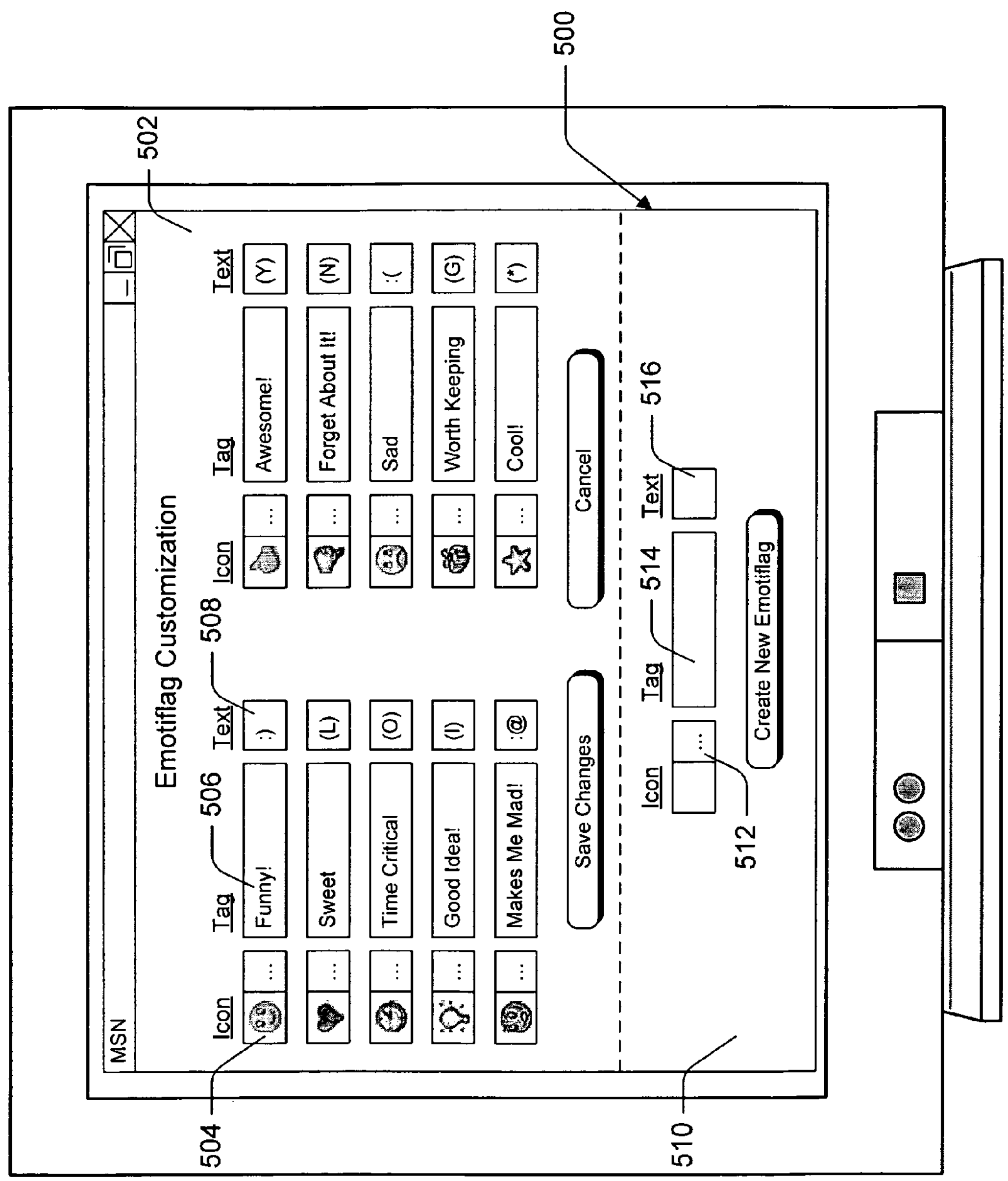
FIG. 5 is a pictorial diagram that illustrates an exemplary user interface for customizing emotiflags.

FIG. 5 illustrates an exemplary user interface 500 for customizing emotiflags. In the illustrated example, an upper portion 502 of the screen displays currently available emotiflags. This list corresponds to the list of emotiflags 208 that is made available to a user as shown in FIG. 2. Each emotiflag has three components: an icon 504, a text tag 506, and a textual representation 508. The icon 504 is a small graphic that is used to represent an emotion or communicable feeling, notion, or idea. The text tag is a word or phrase that is associated with the icon to further communicate the emotion, feeling, notion, or idea. The textual representation is a series of textual symbols that can be displayed in place of the icon, for example, if a system or application does not support display of images. In the illustrated example, a user can modify the icon, text tag, and/or textual representation of any currently maintained emotiflags. In alternate implementations, one or more fields of one or more of the emotiflags may not be modifiable. For example, an email application may be implemented to include a standard set of emotiflags that may not be modified by a user.

In the illustrated example, a lower portion 510 of the screen displays a set of empty fields that a user can fill in to create a new emotiflag. For example, a user may select the " . . . " portion 512 of the icon field to search for an image file that contains an icon for the custom emotiflag. The user may then enter a text tag and a textual representation for the emotiflag in fields 514 and 516, respectively. After the custom emotiflag is created, it is added to the list of available emotiflags 208, as shown in FIG. 2.

Figure 6:
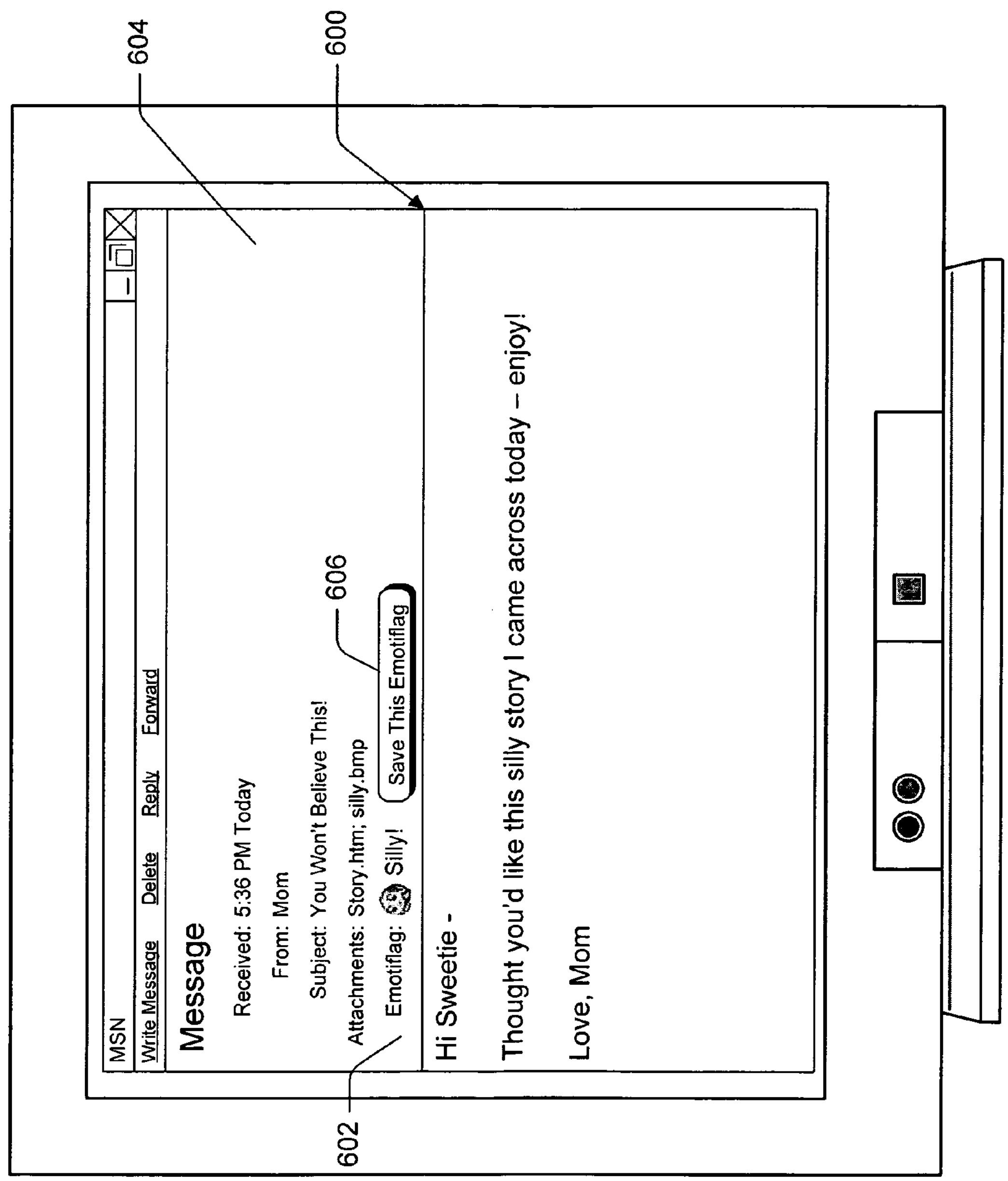
FIG. 6 is a pictorial diagram that illustrates an exemplary user interface for rendering a received email message that has an associated emotiflag.

FIG. 6 illustrates an exemplary user interface 600 for rendering a received email message that has an associated emotiflag. In the illustrated example, an emotiflag field is included in a header area 604. The icon (or textual representation) and text tag of the emotiflag is displayed along with the message header data (e.g., received, from, subject, etc.).

In the illustrated example, the received emotiflag is not found in the user's current list of available emotiflags. To enable the user to save the received emotiflag to their current list of available emotiflags, a save button 606 is rendered next to the emotiflag field. If the user selects the save button 606, the data associated with the emotiflag is extracted from the email message header data, and the emotiflag is added to the user's list of available emotiflags. For example, as described above, the received email header may include, in part, the following data:

From: lindasmith@exampley.com (Linda Smith)
To: bobsmith@examplex.com (Bob Smith)
Date: Fri, Dec. 10, 2004 12:23:45 PST
Subject: You Won't Believe This!
Attachments: story.htm; silly.bmp
X-Emotiflag: silly.bmp, (:p), Silly!

In this example, the X-Emotiflag field includes a filename ("silly.bmp"), a textual representation of an icon ("(:p)"), and a text tag ("Silly!") associated with the emotiflag. The filename (e.g., silly.bmp) corresponds to a file attachment that includes a graphical icon. As described with reference to FIG. 5, the combination of the specified icon, the textual representation of the icon and the text tag can be saved as a custom emotiflag. The emotiflag is then added to a list of available emotiflags that can be accessed by the user.

Figure 7:
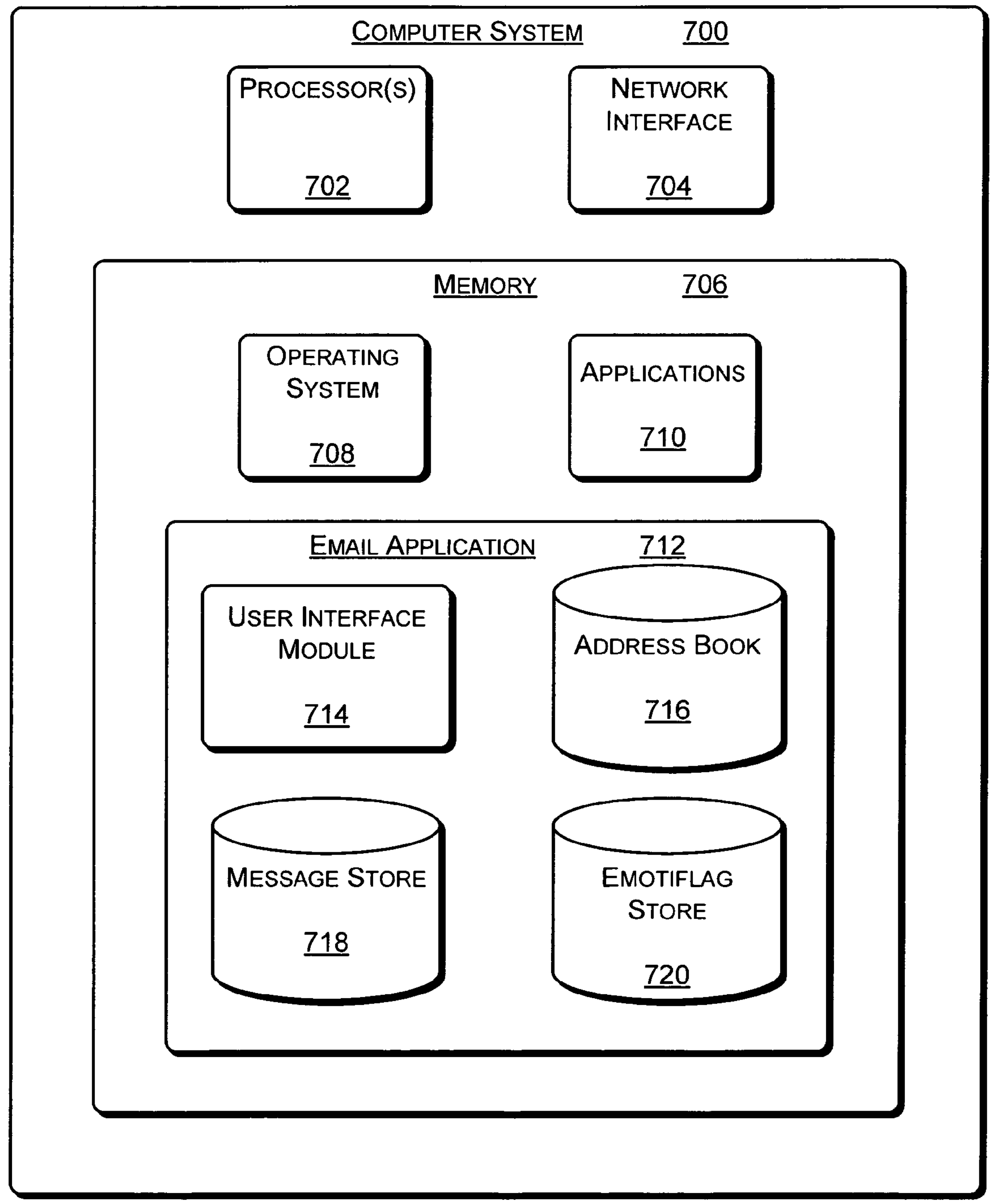
FIG. 7 is a block diagram that illustrates select components of an exemplary computer system that includes an exemplary email application.

FIG. 7 illustrates selected components of an exemplary computer system 700 configured to implement email emotiflags as described herein. Computer system 700 includes one or more processors 702, a network interface 704, and memory component 706. Network interface 704 enables communication between computer system 700 and other computer systems, such as client devices 102 or email server 106 over a network such as email network 104. An operating system 708, one or more applications 710, and email application 712 are stored in memory 706 and executed on processor 702.

Email application 712 includes user interface module 714, address book 716, message store 718, and emotiflag store 720. Email application 712 may also include other components not shown in FIG. 7 such as calendar scheduling component. User interface module 714 is configured to provide user interface screens that enable a user compose email messages, associate emotiflags with email messages, customize emotiflags, view received email messages, save received emotiflags, and otherwise interact with email application 712. Address book 716 is configured to maintain a list of email addresses known to a user. Message store 718 is configured to maintain received email messages, sent email messages, draft email messages, and so on. Emotiflag store 720 is configured to maintain a collection of emotiflags that are available to a user for association with email messages.

Methods for implementing email emotiflags may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
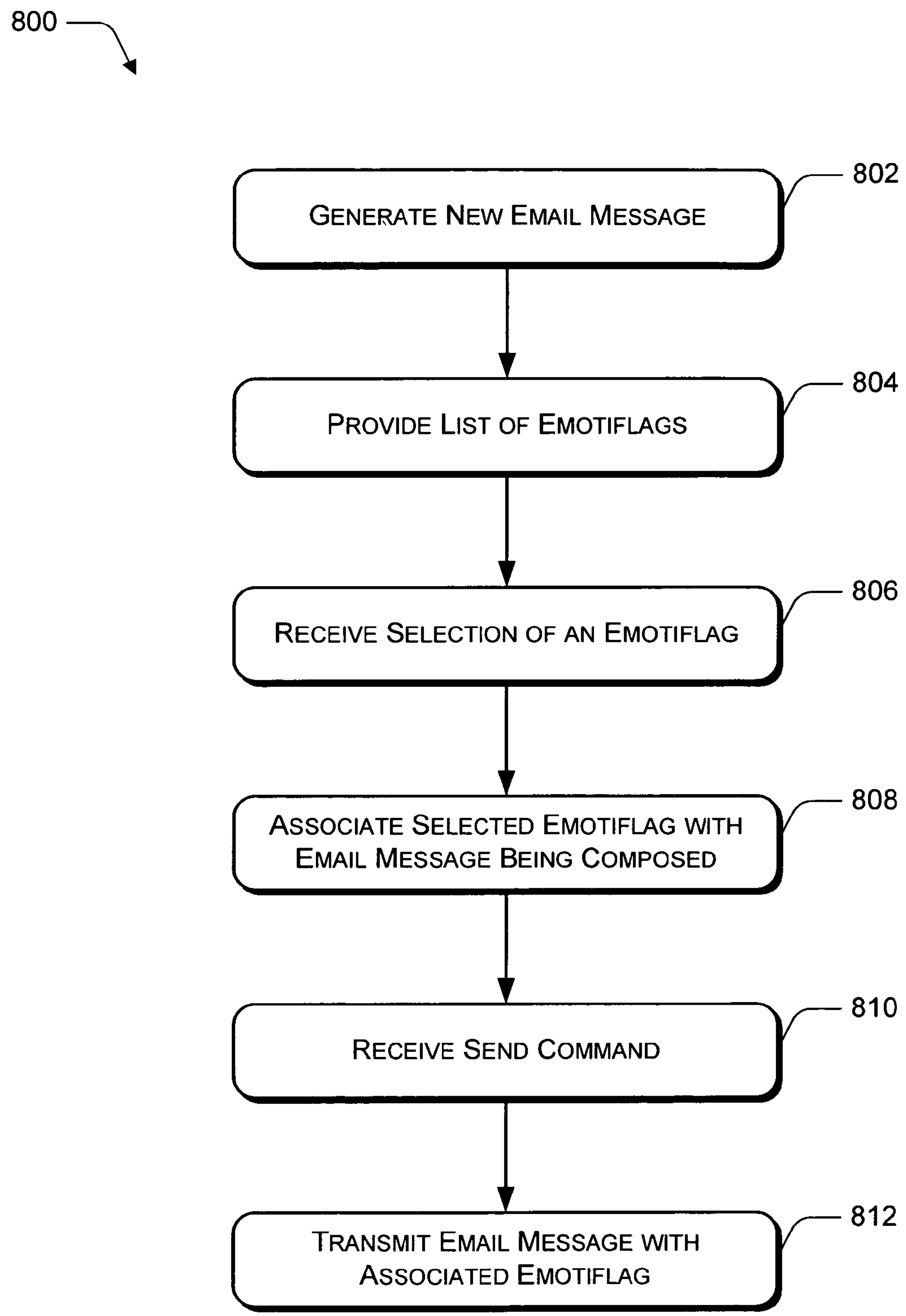
FIG. 8 is a flow diagram that illustrates an exemplary method for associating emotiflags with email messages.
Figure 9:
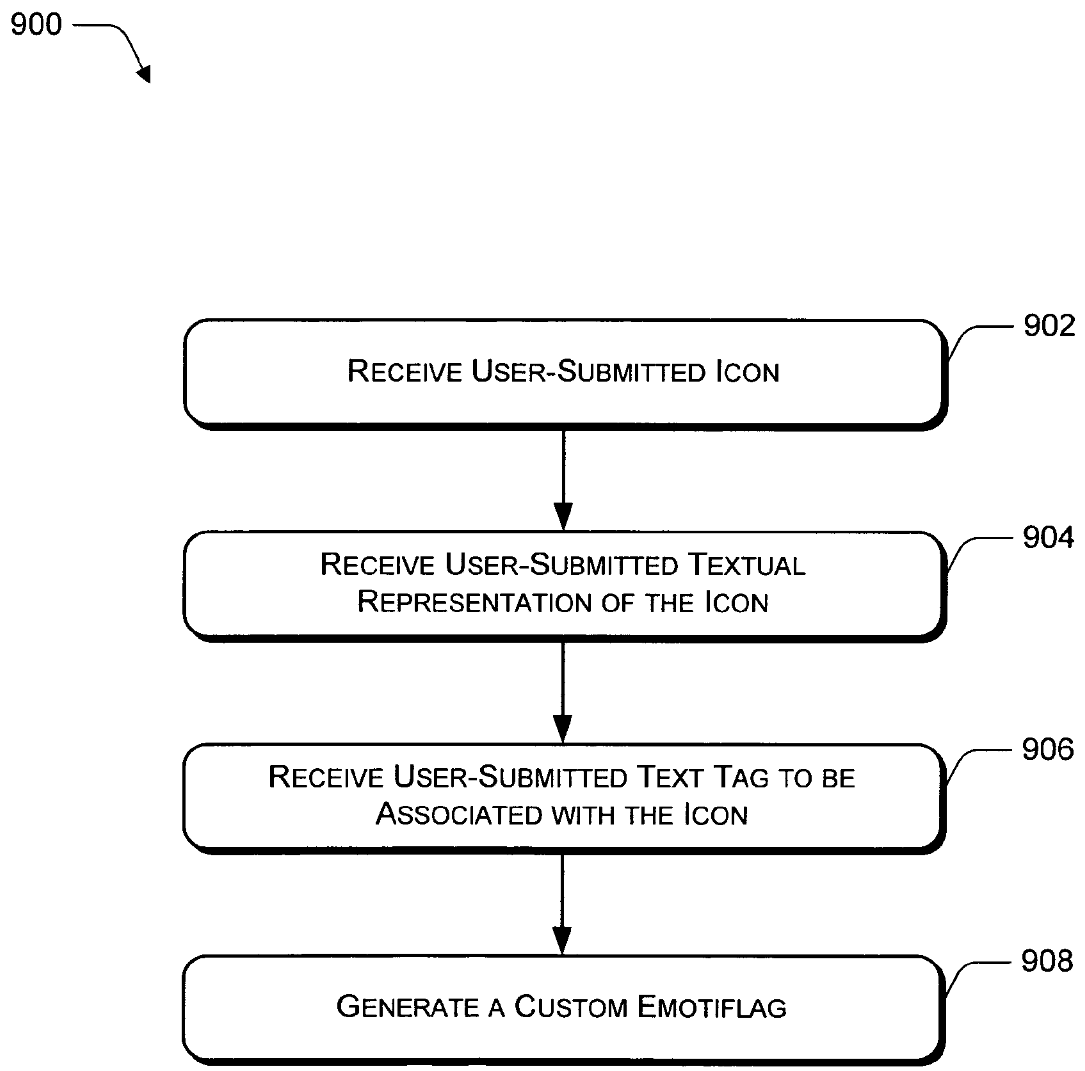
FIG. 9 is a flow diagram that illustrates an exemplary method for generating custom emotiflags.
Figure 10:
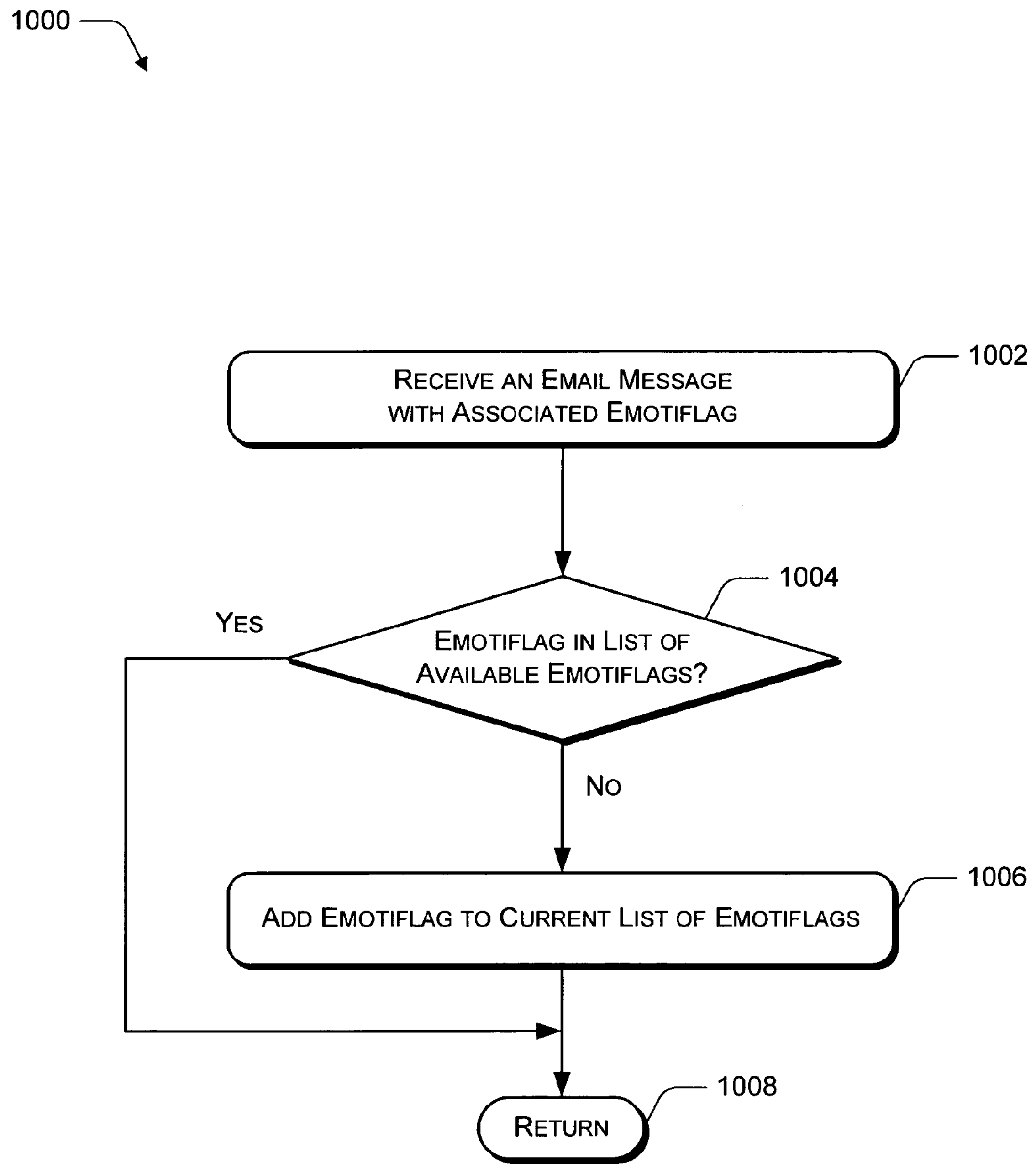
FIG. 10 is a flow diagram that illustrates an exemplary method for receiving custom emotiflags via email messages.

FIGS. 8-10 illustrate exemplary methods for implementing email emotiflags. FIGS. 8-10 are specific examples of email emotiflag implementations, and are not to be construed as limitations. Furthermore, it is recognized that various embodiments may implement any combination of the methods illustrated in FIGS. 8-10 or any combination of portions of the methods illustrated in FIGS. 8-10.

FIG. 8 illustrates an exemplary method 800 for composing an email message with an associated emotiflag. The order in which the method is described is not intended to be construed as a limitation, and any number of the described method blocks can be combined in any order to implement the method. Furthermore, the method can be implemented in any suitable hardware, software, firmware, or combination thereof.

At block 802, a new email message is generated. For example, a user interacts with email application 712 via user interface module 714 as illustrated in FIG. 2.

At block 804, a list of emotiflags is provided. For example, when a user selects an emotiflag drop-down list (e.g., drop-down list 208 shown in FIG. 2), user interface module 714 queries emotiflag store 720 to populate the drop-down list.

At block 806, a selection of an emotiflag is received. For example, a user selects an emotiflag from a drop down list (e.g., drop-down list 208 shown in FIG. 2).

At block 808, the selected emotiflag is associated with the email message currently being composed. For example, user interface module 714 adds emotiflag data to header data associated with the email message. A file containing the icon graphic is added to the message as an attachment; and the icon filename, text tag, and the textual representation of the icon are added to an emotiflag field in the header.

At block 810, a send command is received. For example, user interface module 714 receives a user selected send message command.

At block 812, the email message with the associated emotiflag is transmitted. For example, email application 712 sends the email message via network interface 704.

FIG. 9 illustrates an exemplary method 900 for generating a custom emotiflag. The order in which the method is described is not intended to be construed as a limitation, and any number of the described method blocks can be combined in any order to implement the method. Furthermore, the method can be implemented in any suitable hardware, software, firmware, or combination thereof.

At block 902 a user-submitted icon is received. For example, user interface module 714 receives through a user interface screen (e.g., user interface screen 500), a user selection of a file containing an icon.

At block 904, a user-submitted textual representation of the icon is received. For example, user interface module 714 receives through a user interface screen (e.g., user interface screen 500), a user submitted textual representation to be associated with the icon identified at block 902.

At block 906, a user-submitted text tag is received. For example, user interface module 714 receives through a user interface screen (e.g., user interface screen 500), a user submitted text tag to be associated with the icon identified at block 902.

At block 908, a custom emotiflag is generated. For example, user interface module 714 writes the submitted data to emotiflag store 720.

FIG. 10 illustrates an exemplary method 1000 for receiving a custom emotiflag in association with a received email message. The order in which the method is described is not intended to be construed as a limitation, and any number of the described method blocks can be combined in any order to implement the method. Furthermore, the method can be implemented in any suitable hardware, software, firmware, or combination thereof.

At block 1002 an email message with an associated emotiflag is received. For example, email application 712 receives an email message that includes emotiflag data in the message header.

At block 1004, it is determined whether a list of available emotiflags includes the received emotiflag. For example, email application 712 uses the data found in the received message header to query emotiflag store 720. If the received emotiflag is already stored in emotiflag store 720 (the "Yes" branch from block 1004), then at block 1008, processing of the received emotiflag is complete.

On the other hand, if the received emotiflag is not found in emotiflag store 720 (the "No" branch from block 1004), then at block 1006, the received emotiflag is added to the list of available emotiflags. For example, the received email message and received emotiflag is displayed to a user via user interface module 714, as shown in FIG. 6. If the user wishes to save the received emotiflag, then the user selects the "Save This Emotiflag" button 606, causing the received emotiflag data to be added to emotiflag store 720.

Figure 11:
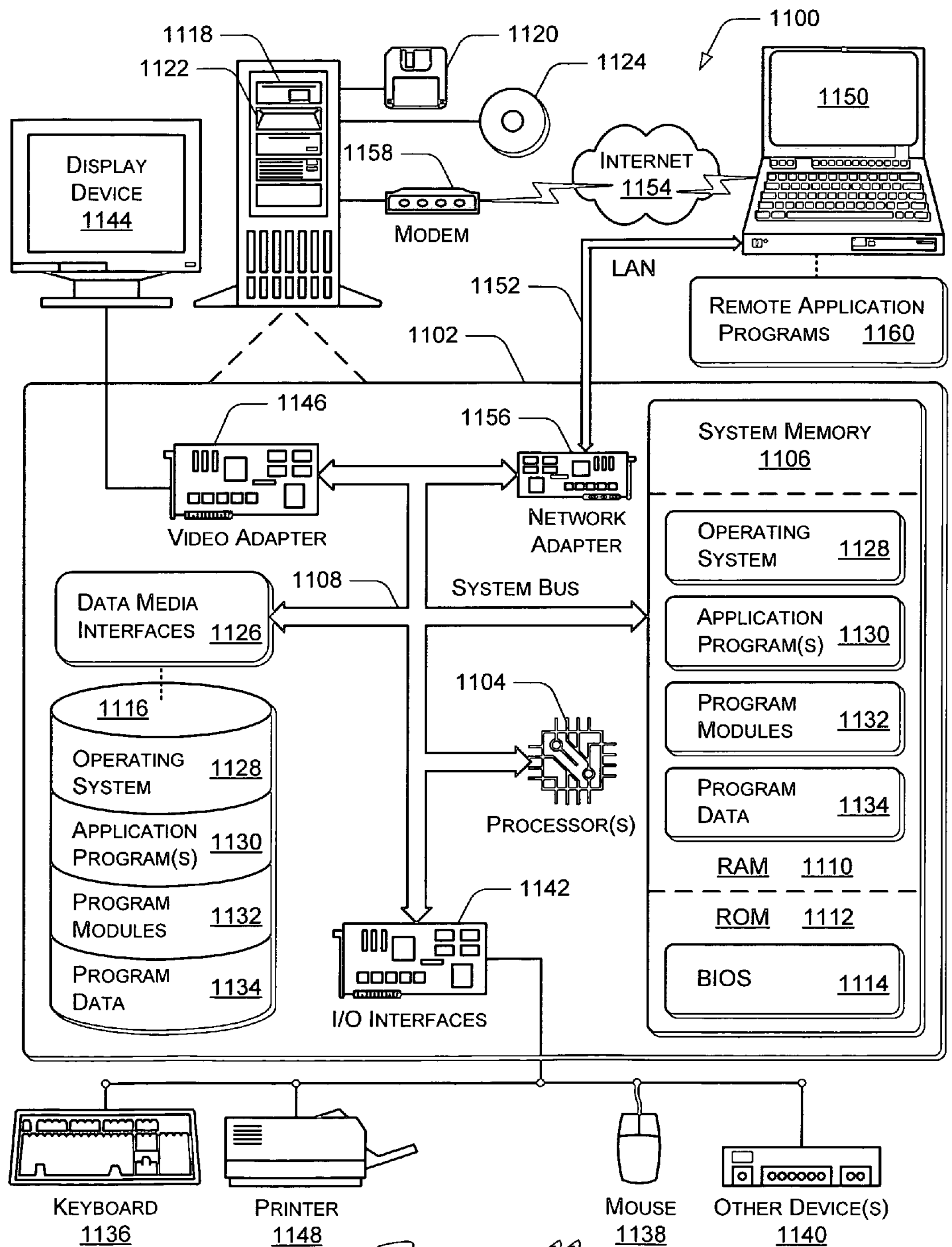
FIG. 11 is a pictorial diagram of exemplary computing systems, devices, and components in an environment in which email emotiflags may be implemented.

FIG. 11 illustrates an exemplary computing environment 1100 within which email emotiflags, as well as the methods, systems, computing, network, and system architectures described herein, can be either fully or partially implemented. Exemplary computing environment 1100 is only one example of a computing system and is not intended to suggest any limitation as to the scope of use or functionality of the architectures. Neither should the computing environment 1100 be interpreted as having any dependency or requirement relating to any one or combination of components illustrated in the exemplary computing environment 1100.

The computer and network architectures in computing environment 1100 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1100 includes a general-purpose computing system in the form of a computing device 1102. The components of computing device 1102 can include, but are not limited to, one or more processors 1104 (e.g., any of microprocessors, controllers, and the like), a system memory 1106, and a system bus 1108 that couples the various system components. The one or more processors 1104 process various computer executable instructions to control the operation of computing device 1102 and to communicate with other electronic and computing devices. The system bus 1108 represents any number of several types of bus structures, including a memory bus or memory controller, a peripheral bus, an accelerated graphics port, and a processor or local bus using any of a variety of bus architectures.

Computing environment 1100 includes a variety of computer readable media which can be any media that is accessible by computing device 1102 and includes both volatile and non-volatile media, removable and non-removable media. The system memory 1106 includes computer readable media in the form of volatile memory, such as random access memory (RAM) 1110, and/or non-volatile memory, such as read only memory (ROM) 1112. A basic input/output system (BIOS) 1114 maintains the basic routines that facilitate information transfer between components within computing device 1102, such as during start-up, and is stored in ROM 1112. RAM 1110 typically contains data and/or program modules that are immediately accessible to and/or presently operated on by one or more of the processors 1104.

Computing device 1102 may include other removable/non-removable, volatile/non-volatile computer storage media. By way of example, a hard disk drive 1116 reads from and writes to a non-removable, non-volatile magnetic media (not shown), a magnetic disk drive 1118 reads from and writes to a removable, non-volatile magnetic disk 1120 (e.g., a "floppy disk"), and an optical disk drive 1122 reads from and/or writes to a removable, non-volatile optical disk 1124 such as a CD-ROM, digital versatile disk (DVD), or any other type of optical media. In this example, the hard disk drive 1116, magnetic disk drive 1118, and optical disk drive 1122 are each connected to the system bus 1108 by one or more data media interfaces 1126. The disk drives and associated computer readable media provide non-volatile storage of computer readable instructions, data structures, program modules, and other data for computing device 1102.

Any number of program modules can be stored on RAM 1110, ROM 1112, hard disk 1116, magnetic disk 1120, and/or optical disk 1124, including by way of example, an operating system 1128, one or more application programs 1130, other program modules 1132, and program data 1134. Each of such operating system 1128, application program(s) 1130, other program modules 1132, program data 1134, or any combination thereof, may include one or more embodiments of the email emotiflag systems and methods described herein.

Computing device 1102 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1102 via any number of different input devices such as a keyboard 1136 and pointing device 1138 (e.g., a "mouse"). Other input devices 1140 (not shown specifically) may include a microphone, joystick, game pad, controller, satellite dish, serial port, scanner, and/or the like. These and other input devices are connected to the processors 1104 via input/output interfaces 1142 that are coupled to the system bus 1108, but may be connected by other interface and bus structures, such as a parallel port, game port, and/or a universal serial bus (USB).

A display device 1144 (or other type of monitor) can be connected to the system bus 1108 via an interface, such as a video adapter 1146. In addition to the display device 1144, other output peripheral devices can include components such as speakers (not shown) and a printer 1148 which can be connected to computing device 1102 via the input/output interfaces 1142.

Computing device 1102 can operate in a networked environment using logical connections to one or more remote computers, such as remote computing device 1150. By way of example, remote computing device 1150 can be a personal computer, portable computer, a server, a router, a network computer, a peer device or other common network node, and the like. The remote computing device 1150 is illustrated as a portable computer that can include any number and combination of the different components, elements, and features described herein relative to computing device 1102.

Logical connections between computing device 1102 and the remote computing device 1150 are depicted as a local area network (LAN) 1152 and a general wide area network (WAN) 1154. Such networking environments are commonplace in offices, enterprise-wide computer networks, intranets, and the Internet. When implemented in a LAN networking environment, the computing device 1102 is connected to a local network 1152 via a network interface or adapter 1156. When implemented in a WAN networking environment, the computing device 1102 typically includes a modem 1158 or other means for establishing communications over the wide area network 1154. The modem 1158 can be internal or external to computing device 1102, and can be connected to the system bus 1108 via the input/output interfaces 1142 or other appropriate mechanisms. The illustrated network connections are merely exemplary and other means of establishing communication link(s) between the computing devices 1102 and 1150 can be utilized.

In a networked environment, such as that illustrated with computing environment 1100, program modules depicted relative to the computing device 1102, or portions thereof, may be stored in a remote memory storage device. By way of example, remote application programs 1160 are maintained with a memory device of remote computing device 1150. For purposes of illustration, application programs and other executable program components, such as operating system 1128, are illustrated herein as discrete blocks, although it is recognized that such programs and components reside at various times in different storage components of the computing device 1102, and are executed by the one or more processors 1104 of the computing device 1102.

Although embodiments of email emotiflags have been described in language specific to structural features and/or methods, it is to be understood that the subject of the appended claims is not necessarily limited to the specific features or methods described. Rather, the specific features and methods are disclosed as exemplary implementations of email emotiflags.

The invention claimed is:

1. A system comprising:

a processor;

a memory;

an email application maintained in the memory and executed on the processor to perform a method, the method comprising:

receiving an email message having an associated emotiflag specified by the composer of the email message to indicate an emotion the composer intends to be associated with the email message as a whole wherein:

the email message comprises:

a message body; and header data, the header data comprising an email subject;

the emotiflag is separate from the message body and the email subject; and the emotiflag comprises:

a graphical icon; and a text tag; and a display device for rendering a representation of the received email message such that the emotiflag is rendered as part of the representation, wherein rendering the emotiflag comprises rendering the graphical icon and the text tag.

2. The system as recited in claim 1, wherein:

the emotiflag further comprises a textual representation of the graphical icon; and rendering the representation of the received email message such that the emotiflag is rendered as part of the representation comprises rendering a textual representation of the graphical icon in place of the graphical icon.

3. The system as recited in claim 1, wherein the method performed by email application further comprises maintaining the emotiflag of the received email message such that a recipient of the email message may later associate the emotiflag with another email message.

4. The system as recited in claim 1, wherein the method performed by the email application further comprises maintaining a plurality of emotiflags, any one of which may be associated with an email message to indicate a feeling to be associated with the email message as a whole.

5. The system as recited in claim 4, wherein:

the emotiflag further comprises a textual representation of the graphical icon; and the method performed by the email application further comprises enabling user-customization of at least one of the graphical icon, the textual representation of the graphical icon, or the text tag, of at least one of the plurality of emotiflags.

6. The system as recited in claim 1, wherein the method performed by the email application further comprises:

identifying a user-selected graphical icon;

identifying a user-submitted text tag; and generating a custom emotiflag comprising the user-selected graphical icon and the user-submitted text tag such that the custom emotiflag can be associated with an email message.

7. The system as recited in claim 1, wherein the method performed by the email application further comprises associating a user-selected emotiflag having a graphical icon and a text tag with a received email message.

8. The system as recited in claim 1, wherein the method performed by the email application further comprises:

receiving an indication of a user-selected emotiflag; and filtering email messages based on the user-selected emotiflag.

9. The system as recited in claim 1, wherein the method performed by the email application further comprises rendering a list of email messages wherein the list is grouped based on emotiflags associated with the email messages.

10. A method comprising:

associating an emotiflag with an email message to indicate a composer-selected emotion to be associated with the email message as a whole, the emotiflag comprising an emoticon and a text tag, wherein the emotiflag is separate from a subject field of the email message and content of the email message; and sending the associated emotiflag with the email message.

11. The method as recited in claim 10, wherein the associating comprises adding the emoticon and the text tag to a header associated with the email message.

12. The method as recited in claim 11, wherein adding the emoticon to the header associated with the email message comprises adding a file containing the emoticon to the email message as an attachment.

13. The method as recited in claim 11, further comprising adding a textual representation of the emoticon to the header associated with the email message.

14. One or more computer storage media comprising computer-readable instructions which, when executed, cause a computer system to:

identify a user-selected graphical icon that represents an emotion, feeling, or sentiment;

identify a user-submitted text tag to be associated with the graphical icon;

definine an emotiflag that comprises an association between the graphical icon and the text tag; and maintain the emotiflag such that the emotiflag can be selected by a user for, association with an email message, wherein the association between the emotiflag and the email message is distinct from content of the email message and distinct from a subject field of the email message.

15. The one or more computer storage media as recited in claim 14, further comprising computer-readable instructions which, when executed, cause the computer system to:

associate the emotiflag with an email message; and send the email message, such that the emotiflag is sent with the email message.

16. The one or more computer storage media as recited in claim 14, further comprising computer-readable instructions which, when executed, cause the computer system to associate the emotiflag with a received email message.

17. The one or more computer storage media as recited in claim 15, further comprising computer-readable instructions which, when executed, cause the computer system to associate the emotiflag with the email message by:

adding the text tag to header data associated with the email message; and adding a file containing the graphical icon as an attachment to the email message.

18. The one or more computer storage media as recited in claim 14, further comprising computer-readable instructions which, when executed, cause the computer system to:

receive an email message having an associated emotiflag that indicates a sentiment associated with the email message as a whole;

identify a graphical icon and a text tag associated with the emotiflag; and maintain the graphical icon and text tag as a custom emotiflag such that the custom emotiflag can be later selected by a recipient of the email message for association with another email message.

19. The one or more computer storage media as recited in claim 14, further comprising computer-readable instructions which, when executed, cause the computer system to:

maintain a plurality of email messages;

receive a user-selection of an emotiflag; and filter the plurality of email messages based on the emotiflag, returning only those email messages with which the selected emotiflag is associated.

20. The one or more computer storage media as recited in claim 14, further comprising computer-readable instructions which, when executed, cause the computer system to:

maintain a plurality of email messages; and render a list of the plurality of email message such that email messages in the list are grouped based on emotiflags associated with the email messages.

* * * * *